(12) United States Patent
Burlingame et al.

(10) Patent No.: US 8,168,131 B2
(45) Date of Patent: May 1, 2012

(54) LOW PRESSURE DROP REFORMING REACTOR

(75) Inventors: Robert Stevens Burlingame, Houston, TX (US); Lloyd Edward Cizmar, Missouri City, TX (US); Larry Gene Hackemesser, Houston, TX (US); Laura Beth Aguilar, Houston, TX (US)

(73) Assignee: Kellog Brown & Root LLC, Houston, TX (US)

( * ) Notice: Subject to any disclaimer, the term of this patent is extended or adjusted under 35 U.S.C. 154(b) by 0 days.

(21) Appl. No.: 12/614,983

(22) Filed: Nov. 9, 2009

(65) Prior Publication Data

US 2010/0074812 A1 Mar. 25, 2010

Related U.S. Application Data

(63) Continuation of application No. 11/501,099, filed on Aug. 8, 2006, now Pat. No. 7,635,456.

(51) Int. Cl.
*B01J 19/00* (2006.01)

(52) U.S. Cl. ........ 422/198; 422/625; 422/641; 422/642; 422/644; 422/645; 422/646; 422/647; 422/650; 422/652; 422/653; 48/95; 48/127.9; 48/127.1; 48/61

(58) Field of Classification Search .............. 422/201, 422/203, 205, 241, 239, 204, 197; 165/158, 165/159

See application file for complete search history.

(56) References Cited

U.S. PATENT DOCUMENTS

| | | | |
|---|---|---|---|
| 3,285,713 A | 11/1966 | Poehler | |
| 5,011,625 A | 4/1991 | LeBlanc | |
| 5,181,937 A * | 1/1993 | Karafian et al. | 48/95 |
| 5,219,535 A * | 6/1993 | Giacobbe et al. | 422/201 |
| 5,362,454 A | 11/1994 | Cizmar | |
| 6,783,750 B2 * | 8/2004 | Shah et al. | 423/652 |
| 6,855,272 B2 * | 2/2005 | Burlingame et al. | 252/373 |
| 7,481,857 B2 * | 1/2009 | Rostrup-Nielsen et al. | 48/61 |
| 7,635,456 B2 * | 12/2009 | Burlingame et al. | 422/608 |
| 2005/0086864 A1 * | 4/2005 | Burlingame et al. | 48/127.9 |
| 2008/0038165 A1 | 2/2008 | Burlingame | |

* cited by examiner

*Primary Examiner* — Kaity V. Handal
(74) *Attorney, Agent, or Firm* — KBR IP Legal Dept.

(57) ABSTRACT

A syngas reforming reactor has a shell-and-tube configuration wherein the shell-side fluid flow path through the tube bundle has a longitudinal configuration. The reactor can include a shell-side inlet fluid distributor plate below the lower end of the tube bundle.

12 Claims, 7 Drawing Sheets

LOW PRESSURE DROP REFORMING REACTOR

CROSS REFERENCE TO RELATED APPLICATIONS

This application is a continuation of co-pending U.S. patent application Ser. No. 11/501,099 filed on Aug. 8, 2006, the entirety of which is incorporated by reference herein.

FIELD

The embodiments relate generally to reforming reactors for syngas production. As an example, the embodiments can relate to reforming reactors with a longitudinal shell-side flow configuration

BACKGROUND

Steam reforming of a hydrocarbon to manufacture syngas is a process in which the hydrocarbon and an oxygen source are supplied to an autothermal reformer. The combustion reaction is exothermic and supplies the heat needed for the catalytic reforming reaction that occurs in the autothermal reformer, which is endothermic, to produce a relatively hot reformed gas. The hot gas from the autothermal reformer is then used as a heat source in the reforming exchanger, which is operated as an endothermic catalytic steam reforming zone. In the reforming exchanger, a feed comprising a mixture of steam and hydrocarbon is passed through catalyst-filled tubes. The outlet ends of the tubes discharge the endothermically reformed gas near the shell side inlet where it mixes with the hot gas from the autothermal reformer. The hot gas mixture is then passed countercurrently across the tubes in indirect heat exchange to supply the heat necessary for the endothermic reforming reaction to occur.

Reforming exchangers are in use commercially and are available. Various improvements to the reforming exchanger design have included, for example, the tube bundle support and low pressure drop tubes.

A need exists for improving the basic reforming exchanger design to minimize the capital cost of the equipment. Current reforming exchanger design uses expensive alloys in the construction the tube bundle and tube sheets since the reforming exchanger are used at relatively high operating temperatures and pressures.

A need exists for improving the basic reforming exchanger design to maximize the capacity of the reforming exchanger within the practical limits of fabrication capabilities. Further, if the size and weight of the reforming exchanger is minimized, maintenance operations that require removal of the tube bundle will be facilitated.

One approach to reducing the capital cost and increasing the capacity of the reforming exchanger is to increase the ratio of surface area to volume of the reactor tubes. By decreasing diameter of the tubes and using monolithic catalyst structures in the reforming exchanger design, the capital costs are decreased and/or the capacity is increased with respect to the tube bundle.

A need for similar improvements to the shell-side of the reforming exchanger, especially improvements that can maintain and improve the advantages of the small-diameter tubes. Previous designs have usually utilized a minimum of five shell-side cross passes with no tubes in the baffle windows. Five cross-flow passes in tube bundles can result in an excessive shell-side pressure drop in some instances. While fewer passes can be used to reduce the shell-side pressure drop, the resulting reforming kinetics could be uneven due to an uneven shell-side temperature profile.

BRIEF DESCRIPTION OF THE DRAWINGS

The detailed description will be better understood in conjunction with the accompanying drawings as follows.

Figure 1:
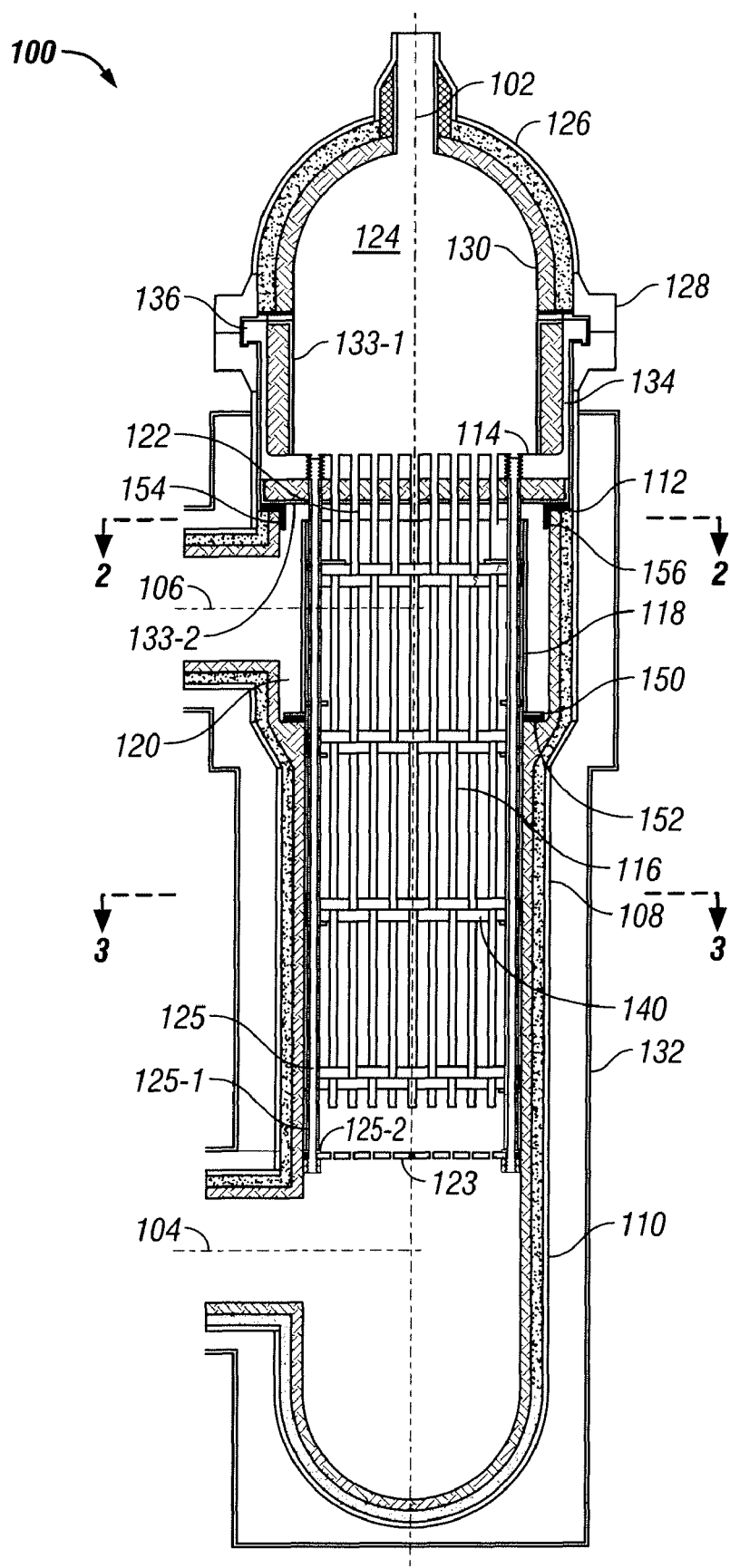
FIG. 1 depicts cross-sectional side elevation of an embodiment of a reforming reactor.

The embodiments are detailed below with reference to the listed Figures.

DETAILED DESCRIPTION OF THE EMBODIMENTS

Before explaining the embodiments in detail, it is to be understood that the embodiments are not limited to the particular embodiments and that they can be practiced or carried out in various ways.

An embodiment of a reforming exchanger design uses a shell-side flow arrangement that provides a longitudinal countercurrent flow through the tube bundle. A longitudinal shell-side flow arrangement can result in efficient heat transfer with a low pressure drop in the shell-side fluid. The longitudinal shell-side flow arrangement benefits from inlet and outlet flow distributors that eliminate the tube-free flow windows utilized on either side of the cross-flow baffles of the conventional prior art cross-flow reforming reactor designs. The longitudinal shell-side flow arrangement can result in a less costly reactor design since the longitudinal shell-side flow arrangement has a relatively smaller shell diameter compared to the prior art cross-flow design.

In an embodiment, a syngas reforming exchanger is provided in the form of a vessel with an elongated shell having relatively high and low temperature ends. A shell side fluid inlet is adjacent to the high temperature end of the reforming exchanger. The shell side fluid inlet allows a hot gas feed to enter the reforming exchanger. A tube side fluid inlet is adjacent to the low temperature end of the reforming exchanger. The tube side fluid inlet allows a reactant feed gas to enter the reforming exchanger. A shell side fluid outlet is fluidly isolated from the tube side fluid inlet by a tube sheet. The shell side fluid outlet is adjacent to the low temperature end of the reforming exchanger and allows the cooled gas to be discharged from the reforming exchanger.

A tube bundle can include one or more tubes, one or more longitudinally-spaced transverse ring baffles, and one or more longitudinally-spaced tube guides. The tubes have an inlet end secured to the tube sheet, and an outlet end located adjacent to the shell side fluid inlet. The gas mixture follows a longitudinal shell-side flow path through the tube bundle. A heat resistant refractory lining can be affixed to an interior surface of the shell about the tube bundle.

A discharge annulus is defined between a flow sleeve disposed about the tube bundle and an enlarged end of the shell adjacent the shell-side fluid outlet, and in fluid communication between the shell-side flow path and the shell-side fluid outlet. The flow sleeve has open end and a sealed end. The open end is spaced from the tube sheet in communication with the shell-side fluid outlet; the sealed end forms a seal with the shell refractory lining at a base of the discharge annulus.

In an embodiment, the reactant gas includes hydrocarbon and steam; the product gas includes reformed gas. The reactor can include catalyst-bearing monolithic structures disposed within the tubes for converting the gas feed mixture to reformed gas. In an embodiment, the tubes have an inside diameter that is not more than 4 times a maximum edge dimension of the catalyst structures.

In an embodiment, the syngas reforming exchanger includes a flange assembly adjacent to the low temperature end. The tube sheet can be secured to a tube sheet using a support member. An example support member can include an annular lip mounted in the flange assembly, and a skirt that extends from and is secured to the lip at one end and secured to the tube sheet at an opposite end. A tube sheet refractory lining can be located on a shell-side face of the tube sheet, and/or a skirt refractory lining can be located on an inside face of the skirt extending from adjacent the lip to the tube sheet. The syngas reforming exchanger can include a seal between the tube sheet refractory lining and an upper end of the shell refractory lining to inhibit shell side fluid entry into an annulus between the skirt and an inner wall of the vessel. As an example, the tube sheet refractory lining can be surfaced with a high temperature, erosion-resistant cap. The tube bundle can be removable from the shell.

In an embodiment, a flow distributor (for example, a perforated transverse plate) can be disposed between the shell-side fluid inlet and the tube bundle.

In an embodiment, one of the ring baffles can be disposed in the flow sleeve adjacent the open end thereof. The tube bundle can include one or more ring baffles (for example from 3 to 6 ring baffles in one embodiment). The ring baffles can have a central flow window, wherein a portion of the tubes pass through the window, and another portion can pass through an annular plate of the baffle.

In an embodiment, the tube guides are in the form of transverse lattice support assemblies, which can include first and second sets of parallel lattice support bars adjacent a common plane and extending between the tubes with opposite ends of the support bars secured to a lattice support ring. The parallel lattice support bars in the first set are transverse to the parallel lattice support bars in the second set. The lattice support ring can include an annular plate extending inwardly from an end of a cylindrical section (for example, one of the ring baffles can extend inwardly from an end of a cylindrical section). The tube bundle can have tie rods to maintain the lattice support assemblies in longitudinal displacement with respect to the tube sheet.

In an embodiment, the seal between the shell refractory lining and the discharge annulus can be formed by a base ring extending outwardly from the flow sleeve, and a seal between the base ring and a transverse annular surface formed in shell refractory lining at the base of the discharge annulus.

In an embodiment, the tubes can have an Lt/Dt ratio of at least 180, wherein Lt is taken as the length of the catalyst bearing extent of the tubes and Dt is the inside diameter of the tubes. In various embodiments, the catalyst-bearing monolithic structures are in the form of a twisted tape insert, a central longitudinal runner and a plurality of bristles extending transversely therefrom, ceramic foam, Raschig rings, or the like.

The countercurrent flow arrangement can be characterized by an effective logarithmic mean temperature difference correction factor of at least 0.95, at least 0.98, at least 0.99, or at least 0.995, or essentially 1.

In another embodiment, the invention provides a method of reforming a hydrocarbon with steam with the reforming exchanger described above. The method includes the steps of supplying a mixture of preheated hydrocarbon and steam to the tube-side inlet of the reforming exchanger, supplying a relatively hot gas to the shell-side inlet, and withdrawing a reformed gas from the shell-side outlet.

Figure 2:
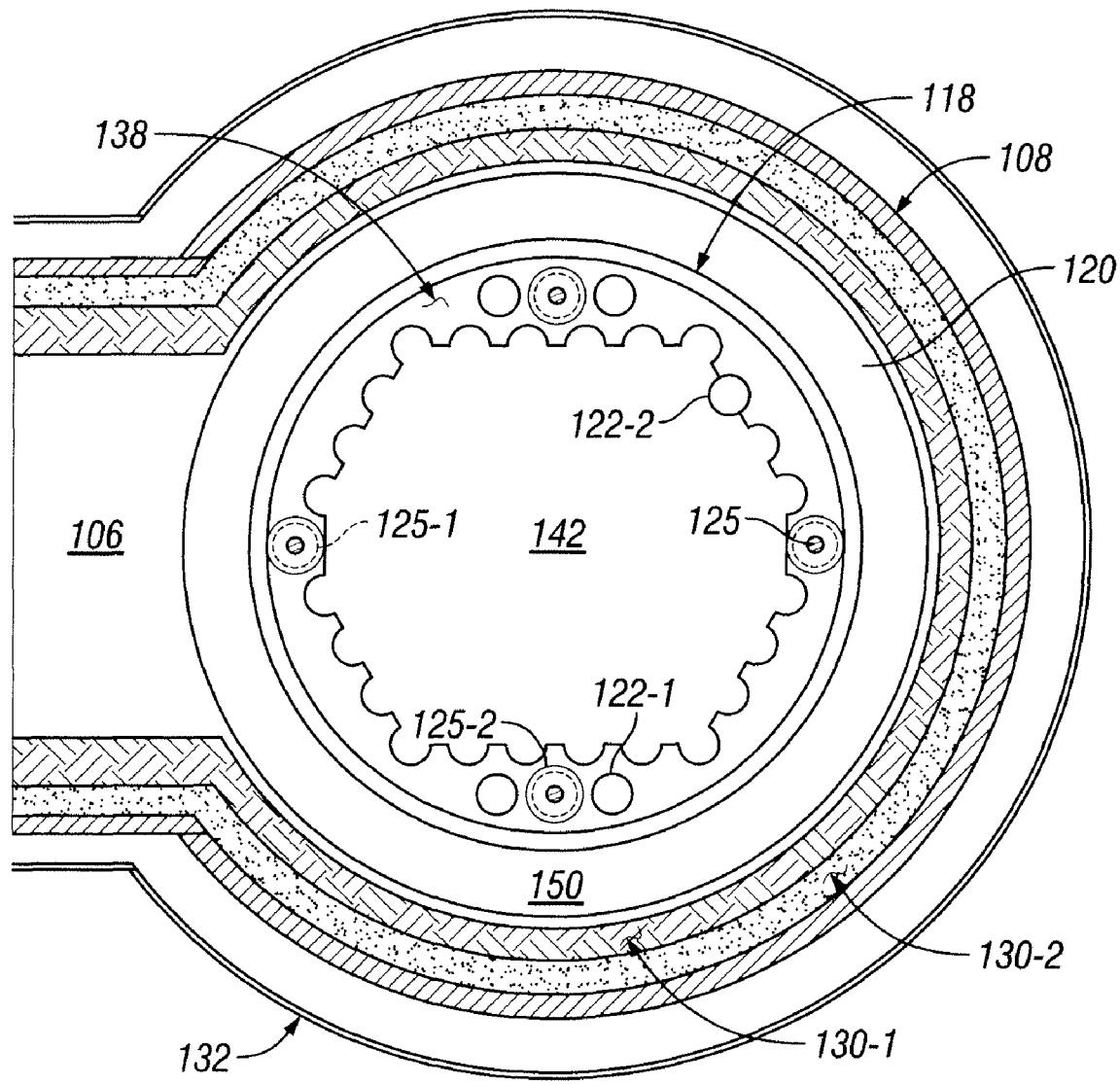
FIG. 2 depicts a cross-sectional view of the embodiment of a reforming reactor as exampled in FIG. 1 as seen along the lines 2-2 showing the discharge flow annulus.
Figure 3:
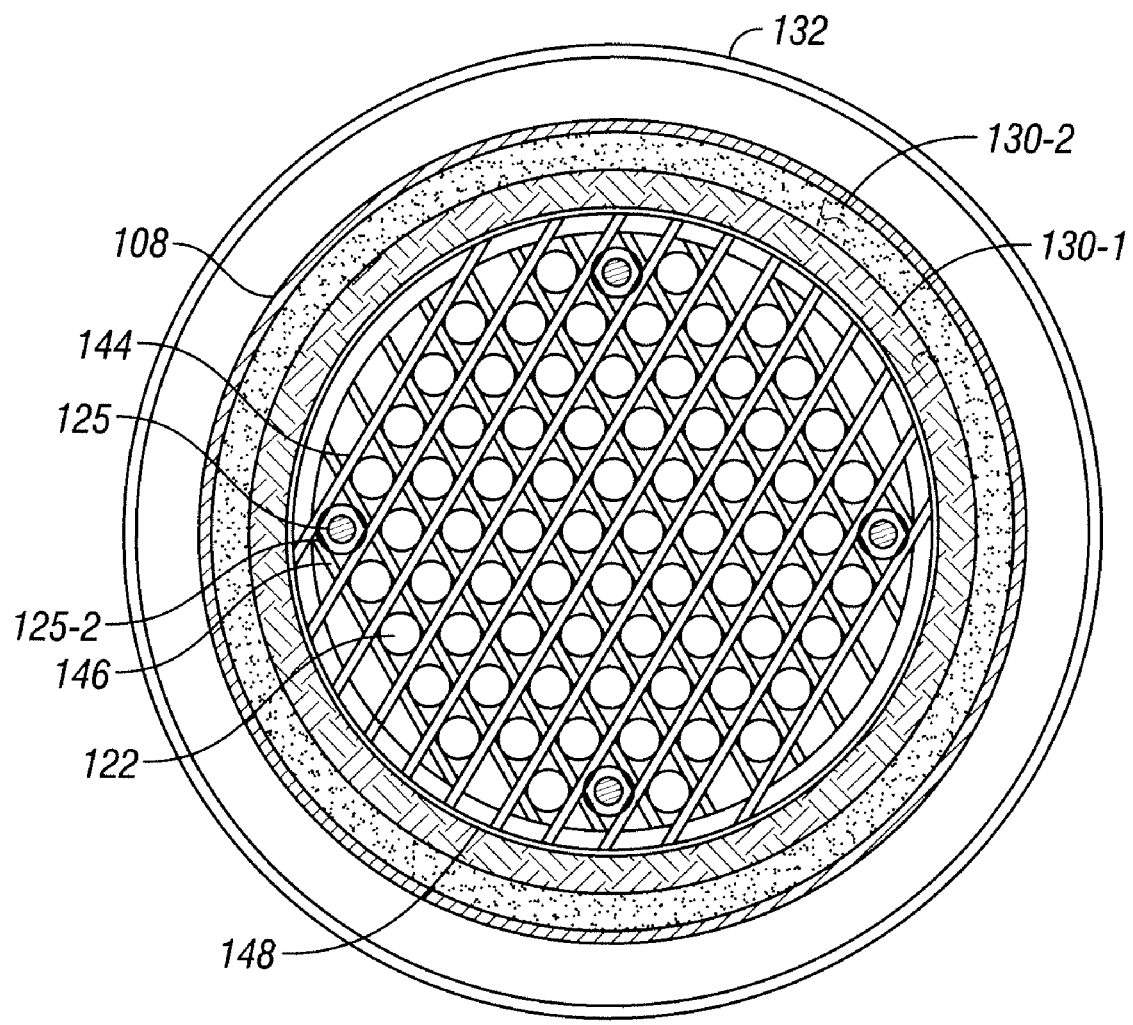
FIG. 3 depicts a cross-sectional view of the embodiment of a reforming reactor as exampled in FIG. 1 as seen along the lines 3-3 showing a lattice support assembly.

With reference to the figures, FIG. 1 depicts cross-sectional side elevation of an embodiment of a reforming reactor. FIG. 2 depicts a cross-sectional view of the embodiment of a reforming reactor as exampled in FIG. 1 as seen along the lines 2-2 showing the discharge flow annulus. FIG. 3 depicts a cross-sectional view of the embodiment of a reforming reactor as exampled in FIG. 1 as seen along the lines 3-3 showing a lattice support assembly. The exampled reforming exchanger 100 in the noted figures has a tube side fluid inlet 102, a shell side fluid inlet 104, and a shell side fluid outlet 106 in an elongated shell 108. The exampled reforming exchanger 100 has respective relatively high and low temperature ends 110 and 112. As used herein, the term "longitudinal" refers to the direction corresponding to the length of the reforming exchanger 100 or generally parallel to the longitudinal axis, whereas "transverse" means transverse with respect to the longitudinal axis unless otherwise indicated.

The shell side fluid inlet 104 is adjacent to the high temperature end 110 for receiving a hot gas feed. The shell side fluid outlet 106 is adjacent to the low temperature end 112 for discharging cooled gas from the reforming exchanger 100. The tube side fluid inlet 102 is adjacent to the low temperature end 112 for receiving a feed mixture of hydrocarbon and steam. The tube side fluid inlet 102 is fluidly isolated from the shell side fluid outlet 106 by tube sheet 114 from which tube bundle 116 is supported. The terms "upper" and "lower" may be used for convenience to correspond to the directions toward the tube-side inlet 102/shell-side outlet 106/low temperature end 112 and toward the shell-side inlet 104/high temperature end 110, respectively, although there is no requirement for such a vertical orientation of the exchanger 100.

In the exampled reforming exchanger 100, a flow sleeve 118 is disposed about the tube bundle 116 adjacent to the shell side fluid outlet 106. A discharge annulus 120 is between an outer surface of the imperforate flow sleeve 118 and an enlarged diameter region of the shell 108. The flow sleeve 118 has an open end spaced from the tube sheet 114, and is sealed at an opposite end adjacent to a base of the discharge annulus 120.

In operation, relatively cool reactant feed fluid (for example, fluid ranging from about 480° to about 760° C.) enters inlet 102. The reactant feed flows downward through tube sheet 114 and the tube bundle 116. The tube bundle 116 includes a plurality (in some embodiments several hundred up to a thousand or more) of catalyst-filled tubes 122 in which the reactants are catalytically reacted. The reacted fluid leaves the lower end of each tube 122. A heating fluid (for example, effluent from a reformer, such as a fired tubular or non-tubular reformer) is introduced in shell side inlet 104, passed through perforations in a distributor plate 123, and distributed to mix with the reacted fluid. The mixture of the reacted fluid and heating fluid flows longitudinally through the tube bundle 116 for generally true countercurrent heat transfer (the logarithmic mean temperature difference correction factor is essentially 1.0 within a 0.5-5% tolerance range) with the tubes 122. The cooled mixture exits the tube bundle 116 from the open end of the flow sleeve 118, through the discharge annulus 120, and is discharged through the shell side fluid outlet 106 for further processing in a conventional manner.

A tube-side inlet chamber 124 can be enclosed by a head 126 secured to shell 108 by flange assembly 128. The tube sheet 114 serves as a partition to isolate fluid in the chamber 124 from fluid in the shell 108. The exchanger 100 can include a heat-resistant refractory lining 130 affixed to the interior surfaces of the chamber 124 and shell 108. The refractory lining can be composed of ceramic or cement-like materials well known in the art and can include one or more layers. For example, the refractory lining can have a high density inner layer 130-1 (as exampled in FIG. 2 and FIG. 3) exposed to the interior of the shell 108 and/or chamber 124, and a backup or insulating layer 130-2 positioned between the inner layer 130-1 and the respective inner surface of the shell 108 and/or chamber 124. This refractory can be assembled using conventional refractory anchors, cold seams, and mounting hardware generally used for this purpose in the art.

The operating temperatures for which the exchanger 100 is designed can vary from approximately 400° C. to approximately 650° C. (752° F. and 1202° F.) for the components in the tube-side chamber 124, and from approximately 650° C. to approximately 1050° C. (1202° F. and 1922° F.) for components in the shell 108. The exchanger 100 can withstand internal pressures up to pressures from approximately 2.4 MPa to approximately 6.9 MPa (350-1000 psi). A conventional water/steam jacket 132 can be used to monitor for generation of greater-than-normal amounts of steam which may indicate a potential "hot spot" or refractory failure.

The tube sheet 114 can be constructed from various types of heat resistant steel plate known in the art, and is preferably supported from a generally cylindrical skirt 134 with a lip 136 for engagement with the flange assembly 128. Refractory linings can be provided at an inside surface of the skirt 134 and a shell-side surface of the tube sheet 114, and these can be provided with a respective erosion-resistant cap 133-1, 133-2, which can be made from a high temperature alloy sheet.

The tube bundle 116 can made up of the tubes 122, one or more ring baffles 138 (also known as donut baffles), and one or more lattice support assemblies 140 (also known as rod or grid baffles). Each individual tube 122 can be expanded and/or strength welded to the tube sheet 114. The tube sheet 114 serves to support and position the tube bundle 116, as well as lattice support assemblies 140, baffles 138, and the distributor plate 123, in conjunction with a plurality of tie rods 125 which are threaded into the tube sheet 114 and extend to stabilize the support assemblies 140 and baffles 138 against spacer tubes 125-1 and washers 125-2.

As exampled in FIG. 2, the baffles 138 can be in the form of an annular plate that can be perforated to slideably receive outermost ones 122-1 of the individual tubes. The baffles 138 alternatively or additionally can have an inner contour to match a profile of outermost and/or penultimately outermost ones 122-2 of the tubes. The baffles 138 can have an outside diameter that, taking thermal expansion into account, matches an inside diameter of the refractory 130 (as exampled in FIG. 1) to facilitate insertion and removal of the modular tube bundle 116. For example, at ambient temperatures the baffles 138 have sufficient clearance with the refractory 130 to allow the tube bundle 116 to be moved or slid in or out of engagement with the refractory, but at operating temperature the baffles 138 have an outside diameter that is nearly equal to the inside diameter of the refractory 130 to inhibit fluid bypass around the outside of the tube bundle 116. The inner contour defines a generally circular flow window 142 for shell-side fluid to flow longitudinally through the tubes 122 within the flow window 142. The baffles 138 can facilitate turbulence and mixing in the shell side fluid to promote a more even shell-side fluid temperature and improve uniformity of heat transfer. As an example, 3 to 6 or more ring baffles 138 can be employed, but the number is not critical and more or fewer can be used.

As exampled in FIG. 1 and FIG. 3, the lattice support assemblies 140 can include first parallel lattice supports 144, and second parallel lattice supports 146 that are transverse to the first lateral supports 144. The lattice supports 144, 146 can be in the form of rectangular bars with a thickness corresponding to a spacing between the tubes 122 and length to span between opposite sides of a support ring 148. In the case of triangular pitch tubes 122, the first and second lattice supports 144, 146 can be oriented with an angular offset about 30 degrees from perpendicular with respect to each other (for example, with a large angle of about 120 degrees and a small angle of about 60 degrees).

The support ring 148 can be welded or otherwise secured to the ends of the lattice supports 144, 146. In one embodiment, the lattice supports 144, 146 are stacked longitudinally in abutment and the length or height of the support ring 148 corresponds to the total height of the lattice supports 144, 146. If desired, the support ring 148 and/or the lattice supports 146 (or alternatively or additionally lattice supports 144) can be secured to one of the baffles 138 for additional strength and to facilitate longitudinal positioning of the lattice support assembly 140 via tie rods 125.

The lattice support assembly 140 serves to maintain spacing and pitch of the tubes 122, and can also facilitate abatement of any vibration. In addition, the lattice support assembly 140 promotes turbulence and thermal mixing of the shell-side fluid as it passes between and around the lattice supports 144, 146, which facilitate a larger temperature differential at the surfaces of the tubes 122 and improve the overall rate and uniformity of the heat transfer.

The support ring 148 can have an outside diameter matching the inside diameter of the refractory 130 in the main part of the shell 108, taking any differential thermal expansion into account, to facilitate insertion and removal of the tube bundle 116, for example, in the hot or operating condition there can be a radial gap of about 3 mm (0.125 in.) between the support ring 148 and refractory 130. In an embodiment, the support ring 148, in one or more of any lattice support assemblies 140 that are adjacent the discharge annulus 120, has an outside diameter matching an inside diameter of the flow sleeve 118 for attachment thereto by welding or other conventional means. The flow sleeve 118 and support ring 148 can be made of the same material or, if different, materials with compatible thermal expansion coefficients. The flow sleeve 118 is positioned on the tube bundle 116 so that the upper end is evenly spaced from the tube sheet 114 and/or its refractory lining so as to define a radial slot for generally uniform passage of the shell-side fluid from the tube bundle 116 into the discharge annulus 120.

The flow sleeve 118 can be secured to an outwardly extending base ring 150 adjacent a lower end opposite the tube sheet 114. The base ring 150 can have a surface opposite the discharge annulus 120 supporting a flow seal 152, such as a conventional resilient high temperature ceramic material that is designed for compression, e.g. from 24 mm to 12 mm in one embodiment. Such gaskets are can be made, for example, from spot-welded 28 BWG tp 347 sheet metal backing filled with 24 mm SAFFIL® 95% alumina low density mat. A transverse annular sealing surface is formed in an upper end the refractory lining 130, possibly within the dense layer 130-1, for sealing engagement with the gasket and base ring 150, conveniently in a transition region at the base of the discharge annulus where the diameter of the shell changes.

The flow sleeve 118 serves to direct shell-side fluid longitudinally over the upper ends of the tubes 122 to prevent short-circuiting of fluid to the shell-side outlet 106 which would otherwise result in uneven heat transfer with the tubes 122. A perfect fluid-tight seal is thus not absolutely necessary, and some limited fluid leakage at seal 152 can be tolerated.

A similar flow seal 154 can be employed between the tube sheet cap 133-2 and a transverse annular surface at an upper end of the refractory 130 adjacent the discharge annulus 120 to facilitate maintaining the lip 136 and flange assembly 128 at a relatively low temperature. If desired, a deflection ring 156 can project from the cap 133-2 adjacent the seal 154 to protect the seal 154 from wash-out that might otherwise result from impingement by the shell-side fluid into the discharge annulus 120.

The tubes 122 can have a ratio of Lt/Dt of at least 180, at least 200, at least 250, at least 300, or at least 300-400. In determining Lt/Dt, the diameter Dt refers to the inside diameter of the tubes 122 in the case of right circular cylindrical tubes, or to the equivalent hydraulic diameter in the case of non-circular tubes. The length Lt refers to the catalyst-filled or -packed length. Higher Lt/Dt ratios are preferred in the embodiments because the heat transfer coefficients are generally higher than with a lower Lt/Dt ratio, and the resulting equipment cost is lower. A longer, smaller-ID catalyst tube 122 can result in more tubes 122 in the tube bundle 116, but the tube bundle 116 can have a smaller diameter for a given conversion capacity, allowing the use of a shell 108 that has a smaller diameter. The reduction of the diameter of the shell 108 and tube bundle 116 can result in more capital cost savings than result from any increase in the length thereof, and thus the reforming exchanger 100 of the present invention can be much cheaper to fabricate than a prior art reforming exchanger of equivalent capacity. This result is advantageous in the design of a new reforming exchanger 100.

If the same shell diameters and tube lengths of a prior art reforming exchanger are used so that the capital costs thereof are substantially equivalent, the conversion capacity of the reforming exchanger 100 is substantially increased. This latter result is advantageous in the replacement of existing reforming exchangers so that the new reforming exchanger 100 has about the same size but with a higher capacity than the original reforming exchanger it replaced.

In the embodiments, the ratio of the tube inside diameter (ID), Dt, to the largest edge dimension of the catalyst structure (Dp) can be relatively small compared to the same ratio in conventional reforming exchangers, as exampled in Burlingame U.S. Pat. No. 6,855,2721. For example, in prior art reforming exchangers employing Raschig ring catalyst measuring 8 mm (0.31-in.) OD by 3 mm (0.125-in.) ID by 8 mm (0.31-in.) long, the minimum tube ID was about 50.8 mm (2 in.). In the Burlingame design, the same Raschig ring catalyst can be used in approximately 32 mm (1.25-in.) or even 25 mm (1-in.) ID tubes with an equivalent or slightly higher ratio of heat transfer to pressure drop. In Burlingame design, the Dt/Dp ratio is preferably not more than 4, and more preferably about 3 or less.

A low delta P catalyst structure is defined herein as any suitable catalyst structure that results in a higher rate of heat transfer per unit of tube side pressure drop than in 50.8 mm (2-in.) ID reforming exchanger tubes filled with catalyst-supporting Raschig rings measuring 8 mm (0.31-in.) OD by 3 mm (0.125-in.) ID by 8 mm (0.31-in.) long under similar operating conditions and conversions.

Several different types of low delta P monolithic catalyst support structures are disclosed in Burlingame et al. While the low delta P is an important property, the Burlingame et al. catalysts are also typically found to have a relatively high void fraction and present a tortuous flow path to the tube side fluid. Catalyst activity can be relatively low to moderate without significant reduction in conversion rates, although there is no general detriment to using a high activity catalyst aside from the typically higher cost involved.

In an embodiment, the skirt 134 can be constructed of different materials to facilitate reducing thermal stresses which could develop in service. The tube sheet 114 is generally made of a high temperature alloy (for example, 304H stainless steel) with a relatively high thermal expansion coefficient. A lower portion of the skirt 134 can be made of the same or a similar high temperature alloy welded directly to the tube sheet 114. The lip 136 and an upper portion of the skirt 134 can be made of materials, which can be the same or different, suited for relatively cooler temperatures (for example, 1¼% chromium-½% molybdenum steel alloy) generally having a relatively lower thermal expansion coefficient. An intermediate portion of the skirt 134 can be made from a material having an intermediate thermal expansion coefficient (for example, INCONEL chromium-nickel alloy) to help relieve the thermal stresses which could otherwise develop if the skirt 134 were made from only one or two materials.

The lip 136 can be provided with a plurality of threaded bores (not shown) by which the entire assembly of the skirt 134, the tube sheet 114 and the tube bundle 116 are conventionally hoisted for pulling or replacement when this is necessary, for example, by threading eye bolts into the bores and passing a suitable cable from a crane, wench, hoist or the like through the eyes. The base ring 150 has an outside diameter that is less than the outside diameter of the discharge annulus 120 so that the base ring 150 can clear the refractory 132 during insertion of the tube bundle 116. Similarly, the tube sheet 114 and skirt 134 have an outside diameter less than the inside diameter of the cylindrical portion of the chamber 124 below the flange assembly 128.

With the flange assembly 128 disengaged and the head 126 removed, the preassembled tube sheet 114, tube bundle 116, and skirt 134, can be hoisted above the shell 108 and lowered in place for the base ring 150 and seal 152 to engage (at operating temperature) with the refractory 132 at the lower end of the discharge annulus 120, for the cap 133-2 and seal 154 to engage (at operating temperature) with the refractory 132 at the lower end of the discharge annulus 120, and for the lip 136 to engage with the lower flange of the flange assembly 128.

A distributor plate 123 can be positioned below the tube bundle 116 and secured to the tube sheet 114 by the tie rods 125 and nuts 125-1. The distributor plate 123 has an outside diameter matching an inside diameter of the refractory 130, and is perforated to assure uniform distribution of the flow of the process gas from the shell-side fluid inlet 104. The size, number and shape of the perforations are selected to provide the desired flow distribution at the expected operating conditions. A series of distributor plates may be used if required for adequate flow distribution.

Figure 4:
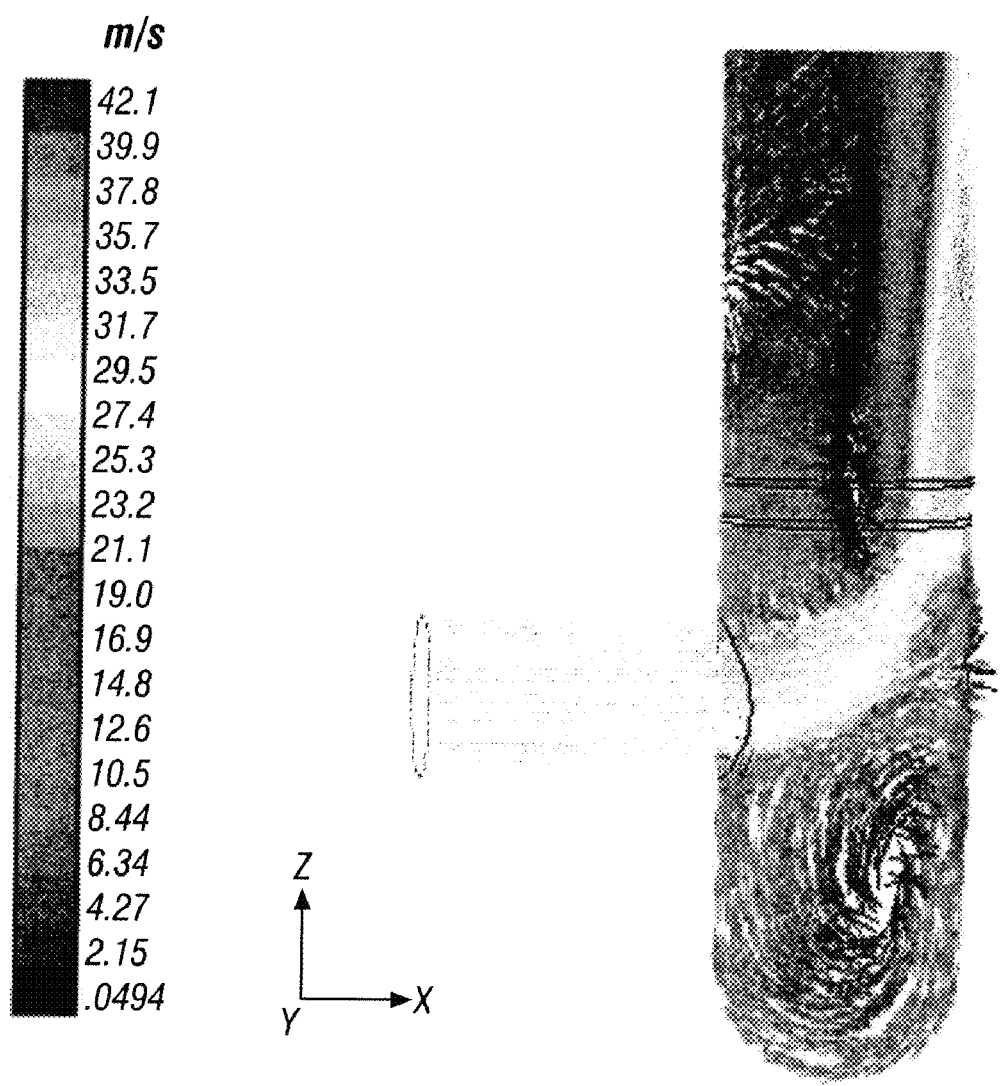
FIG. 4 depicts a velocity vector diagram of a comparative reforming reactor with the embodiments exampled in FIG. 1, FIG. 2, and FIG. 3, but without the shell-side inlet distributor, shown in vertical section.
Figure 5:
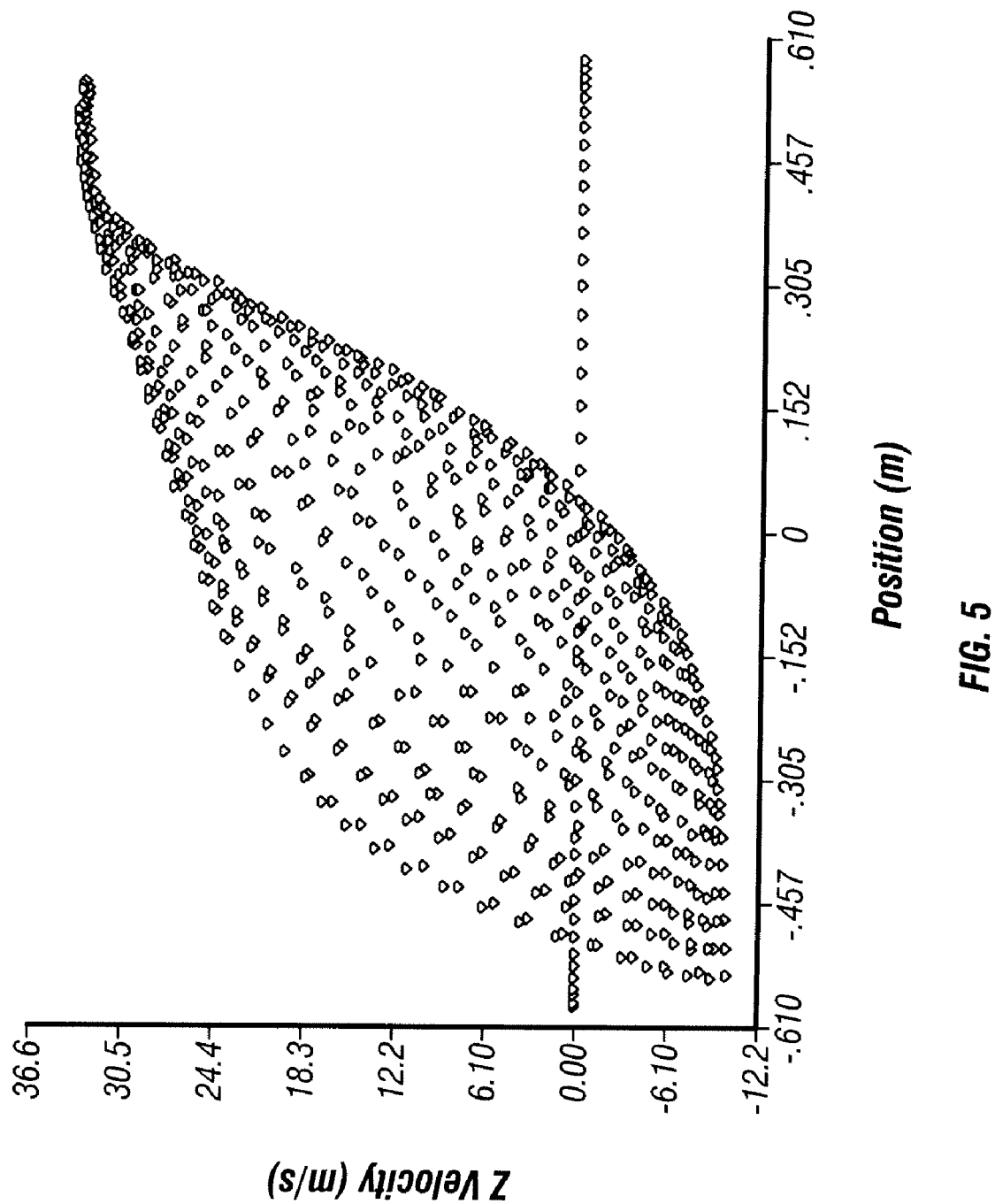
FIG. 5 depicts a longitudinal direction velocity diagram of a comparative reforming reactor with the embodiments exampled in FIG. 1, FIG. 2, and FIG. 3, but without the shell-side inlet distributor, shown in vertical section.
Figure 6:
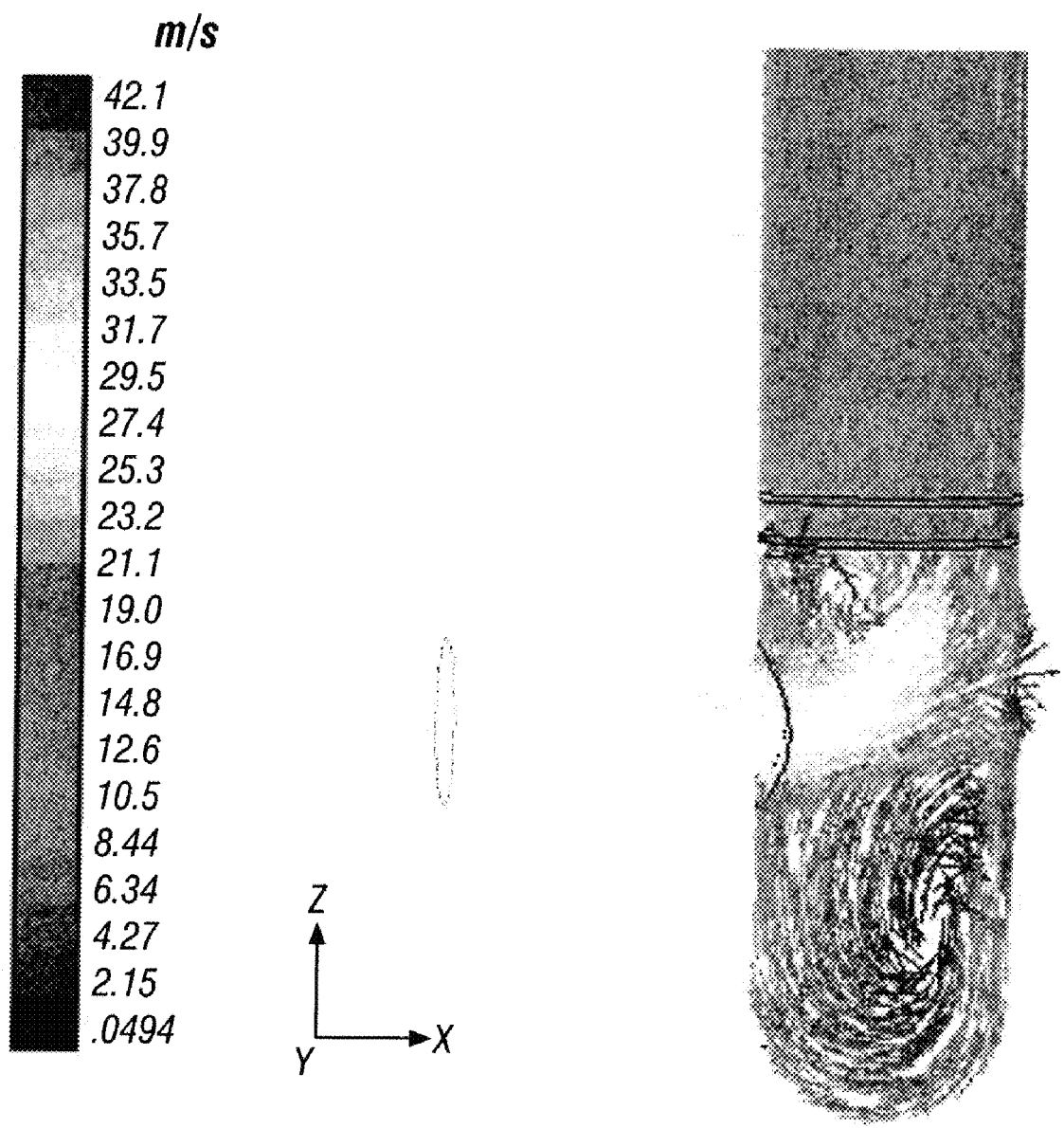
FIG. 6 depicts a velocity vector diagram of a reforming reactor with embodiments exampled in FIG. 1, FIG. 2, and FIG. 3 with a shell-side inlet distributor, shown in vertical section.
Figure 7:
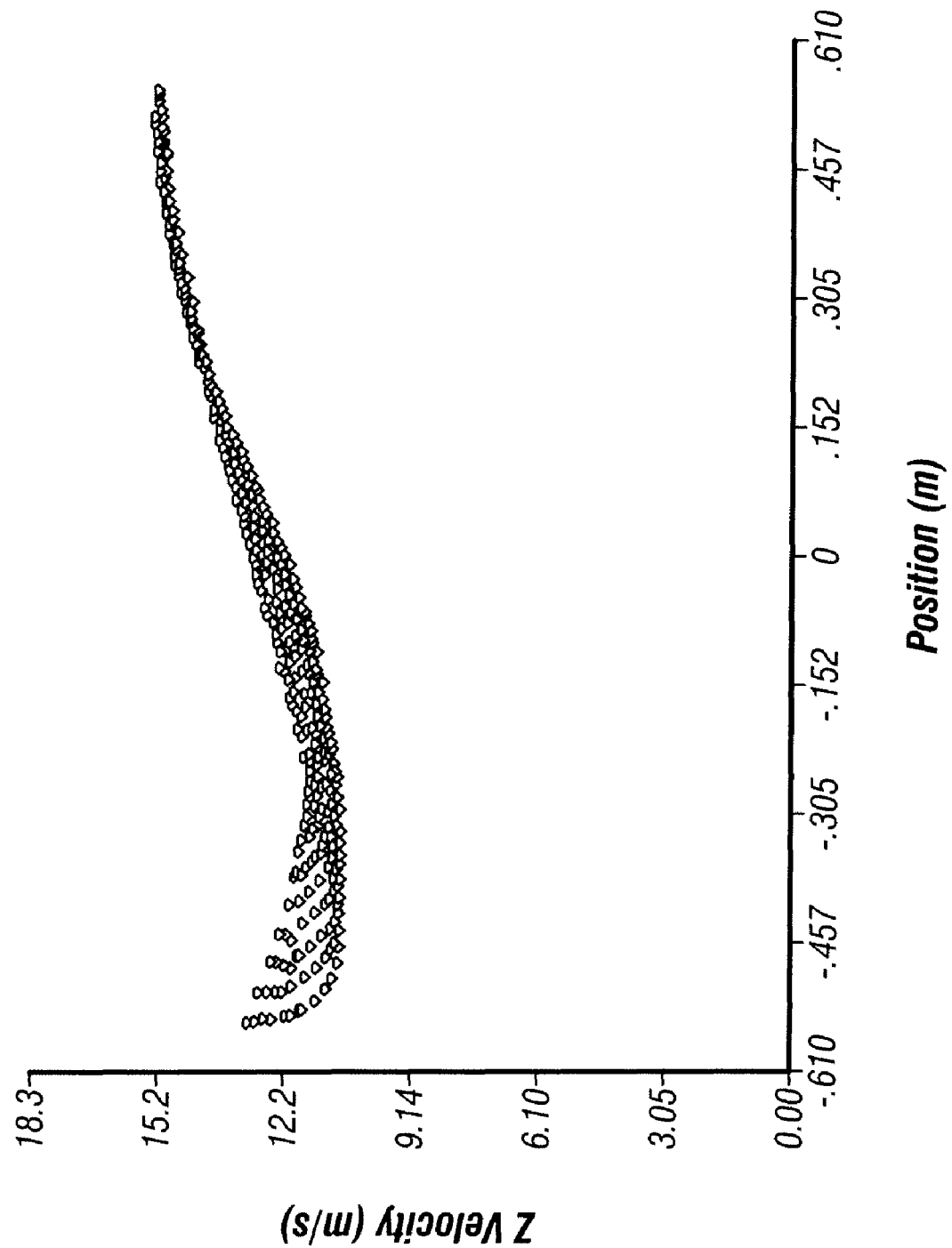
FIG. 7 depicts a longitudinal direction velocity diagram of a reforming reactor with embodiments exampled in FIG. 1, FIG. 2, and FIG. 3 with a shell-side inlet distributor 123, shown in vertical section.

FIG. 4 depicts a velocity vector diagram of a comparative reforming reactor with the embodiments exampled in FIG. 1, FIG. 2, and FIG. 3, but without the shell-side inlet distributor, shown in vertical section. FIG. 5 depicts a longitudinal direction velocity diagram of a comparative reforming reactor with the embodiments exampled in FIG. 1, FIG. 2, and FIG. 3, but without the shell-side inlet distributor, shown in vertical section. FIG. 6 depicts a velocity vector diagram of a reforming reactor with embodiments exampled in FIG. 1, FIG. 2, and FIG. 3 with a shell-side inlet distributor, shown in vertical section. FIG. 7 depicts a longitudinal direction velocity diagram of a reforming reactor with embodiments exampled in FIG. 1, FIG. 2, and FIG. 3 with a shell-side inlet distributor 123, shown in vertical section.

For comparison purposes, FIG. 4 and FIG. 5 illustrate the flow arrangement without the distributor plate 123, and FIG. 6 and FIG. 7 illustrate the flow arrangement with the distributor plate present with a pressure drop of approximately 3.45 kPa (0.5 psi). The flow distributions seen in FIGS. 4 through 7 were developed using a computational fluid dynamic (CFD) model based on a simplified arrangement without the tube bundle 116. FIG. 6 and FIG. 7 show that significant improvement in the uniformity of the flow is achieved, and even better distribution can be expected if the tube bundle 116 were taken into account in the model.

EXAMPLES

Design parameters for a longitudinal flow reforming reactor 100 according to the present invention (Example 1) was developed as the result of a conceptual sizing review and compared to 3-, 4- and 5-pass cross flow reforming reactors (Comparative Examples 1-3). The design basis included tubes with an OD of 28.575 mm (1.125 in.) and a maximum shell-side pressure drop of 50 kg/cm2 (7.25 psi). The design parameters and relative capital costs are summarized in Table 1 below.

TABLE 1

| Parameter | Example 1 | Comp. Example 1 | Comp. Example 2 | Comp. Example 3 |
|---|---|---|---|---|
| Shell-side flow configuration | longitudinal | 3-pass cross flow | 4-pass cross flow | 5-pass cross flow |
| Refractory ID, mm (in.) | 1265 (50) | 1549 (61) | 1778 (70) | 2032 (80) |
| Shell ID, mm (in.) | 1620 (64) | 1905 (75) | 2134 (84) | 2388 (94) |
| Tube length mm (ft) | 5600 (18.37) | 5258 (17.25) | 5639 (18.5) | 6096 (20) |
| Number of tubes | 927 | 843 | 875 | 916 |
| Relative surface area m2 (ft2) | 447 (4811) | 381 (4101) | 425 (4575) | 483 (5200) |
| Shell side ΔP, kg/cm2 (psi) | 0.49 (6.97) | 0.47 (6.69) | 0.47 (6.69) | 0.51 (7.25) |
| Shell-side coefficient, kcal/h-m2-C (Btu/hr-ft2-° F.) | 439 (90) | 1592 (326) | 1421 (291) | 1352 (277) |
| Excess surface, % | 8.5 | 6.6 | 20.1 | 37.9 |
| Estimated cost (relative) | Base = 1.0 | 1.09 | 1.27 | 1.48 |

These results show that the shell and refractory inside diameters are significantly less with a longitudinal shell-side flow configuration than with a cross-flow configuration. The estimated cost of the longitudinal flow reactor (Example 1) is lower than the cross flow reactors (Comp. Examples 1-3). The capital cost is substantially lowered for the case of the longitudinal flow reactor of Example 1, or alternatively the shell-side pressure drop could be significantly lower for the same capital cost.

All patent references and publications referred to above are hereby incorporated herein by reference in their entirety for the purpose of US patent prosecution and other jurisdictions where permitted.

While these embodiments have been described with emphasis on the embodiments, it should be understood that within the scope of the appended claims, the embodiments might be practiced other than as specifically described herein.

What is claimed is:

1. A syngas reforming exchanger comprising:
a vessel comprising an elongated shell having relatively high and low temperature ends;
a shell side fluid inlet adjacent the high temperature end for receiving a hot gas feed;
a tube side fluid inlet adjacent the low temperature end for receiving a reactant feed gas;
a shell side fluid outlet fluidly isolated from the tube side fluid inlet by a tube sheet adjacent the low temperature end for discharging cooled gas;
a tube bundle comprising a plurality of tubes, wherein the tubes have an inlet end secured to the tube sheet for receiving the feed mixture and an outlet end adjacent the shell side fluid inlet for discharging product gas into the hot gas feed to form a gas mixture;
a longitudinal shell-side flow path for the gas mixture through the tube bundle;
a heat resistant refractory lining affixed to an interior surface of the shell about the tube bundle;
an imperforate sleeve at least partially disposed about the tube bundle for directing the gas mixture over the inlet ends of the tubes; and
a discharge annulus defined between the sleeve and the shell slide fluid outlet.

2. The syngas reforming exchanger of claim 1, further comprising catalyst-bearing monolithic structures disposed within the tubes for converting the gas feed mixture to reformed gas, wherein the tubes have an inside diameter that is not more than 4 times a maximum edge dimension of the catalyst structures.

3. The syngas reforming exchanger of claim 2, wherein the catalyst-bearing monolithic structures comprise a member selected from the group consisting of a twisted tape insert; ceramic foam; Raschig rings; and central longitudinal runner and a plurality of bristles extending transversely therefrom.

4. The syngas reforming exchanger of claim 2, wherein the catalyst-bearing monolithic structures comprise a twisted tape insert with a wash-coated surface impregnated with a nickel-containing catalyst.

5. The syngas reforming exchanger of claim 2, wherein the catalyst-bearing monolithic structures comprise a central longitudinal runner, a plurality of bristles extending transversely therefrom and the bristles are wash-coated and impregnated with a nickel-containing catalyst.

6. The syngas reforming exchanger of claim 1, further comprising:
 a flange assembly adjacent the low temperature end;
 wherein the tube sheet is secured to a tube sheet support member comprising an annular lip mounted in the flange assembly and a skirt extending from and secured to the lip at one end and secured to the tube sheet at an opposite end;
 a tube sheet refractory lining on a shell-side face of the tube sheet;
 a skirt refractory lining on an inside face of the skirt extending from adjacent the lip to the tube sheet.

7. The syngas reforming exchanger of claim 6, further comprising a seal between the tube sheet refractory lining and an upper end of the shell refractory lining to inhibit shell side fluid entry into an annulus between the skirt and an inner wall of the vessel.

8. The syngas reforming exchanger of claim 7, wherein the tube sheet refractory lining is surfaced with a high temperature, erosion-resistant cap.

9. The syngas reforming exchanger of claim 1, further comprising a flow distributor disposed between the shell-side fluid inlet and the tube bundle.

10. The syngas reforming exchanger of claim 9, wherein the flow distributor comprises a perforated transverse plate.

11. The syngas reforming exchanger of claim 1, wherein the tubes have an Lt/Dt ratio of at least 300, wherein Lt is taken as the length of the catalyst bearing extent of the tubes and Dt is the inside diameter of the tubes.

12. A syngas reforming exchanger comprising:
 a vessel comprising an elongated shell having relatively high and low temperature ends;
 a shell side fluid inlet adjacent the high temperature end for receiving a hot gas feed;
 a tube side fluid inlet adjacent the low temperature end for receiving a reactant feed gas;
 a shell side fluid outlet fluidly isolated from the tube side fluid inlet by a tube sheet adjacent the low temperature end for discharging cooled gas;
 a tube bundle comprising a plurality of tubes, wherein the tubes have an inlet end secured to the tube sheet for receiving the feed mixture and an outlet end adjacent the shell side fluid inlet for discharging product gas into the hot gas feed to form a gas mixture, and one or more lattice support assemblies for maintaining spacing and pitch of the plurality of tubes;
 a longitudinal shell-side flow path for the gas mixture through the tube bundle;
 a heat resistant refractory lining affixed to an interior surface of the shell about the tube bundle;
 an imperforate sleeve disposed at least partially about the tube bundle for directing the gas mixture over the inlet ends of the tubes; and
 a discharge annulus defined between the sleeve and the shell slide fluid outlet.

* * * * *